C. A. TAYLOR.
Trunk.

No. 8,901. Reissued Sept. 16, 1879.

Attest:
Chas. H. Schoff
S. S. Schoff

INVENTOR:
Charles A. Taylor
By Coyne & Co.
his Attorneys

N. PETERS, PHOTO-LITHOGRAPHER, WASHINGTON, D. C.

UNITED STATES PATENT OFFICE.

CHARLES A. TAYLOR, OF CHICAGO, ILLINOIS.

IMPROVEMENT IN TRUNKS.

Specification forming part of Letters Patent No. 77,127, dated April 21, 1868; Reissue No. 8,901, dated September 16, 1879; application filed March 22, 1879.

*To all whom it may concern:*

Be it known that I, CHARLES A. TAYLOR, of Chicago, in the county of Cook and State of Illinois, have invented certain new and useful Improvements in Fastenings for Trunks; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to trunks; and consists of a novel method of preventing the top or lid from becoming loose in handling.

Figure 1:
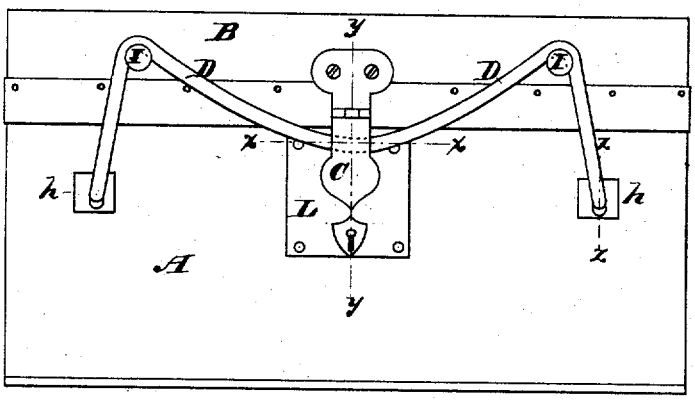
Figure 2:
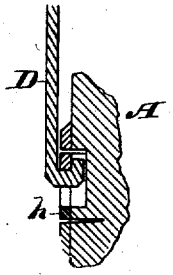
Figure 3:
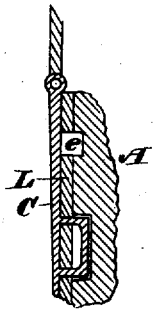
Figure 4:
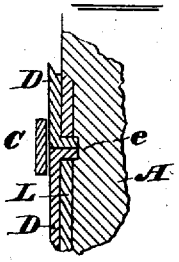

In the drawings, Figure 1 is a front view of a trunk with my improvement applied; and Figs. 2, 3, and 4 are sectional views of parts detached, to show them more in detail.

On account of the rough usage to which trunks are subjected in handling they are often broken open, either by accident or design. The hinges, hasp, and buckles and leather straps, being the only means provided for fastening them, are not infrequently insufficient for the purpose, and when the hasp or lock is broken the straps, being of leather, may be readily cut, and the trunk thus entered and rifled. Lateral strains upon the lid also tend to wrench the hasp and lock, as well as the hinges, when buckles and leather straps are employed to aid in keeping the lid or top in its proper place.

To remedy some or all of these deficiencies, I secure to the front side of the cover or lid B two strong knobs, studs, or fastenings, I I, as shown in Fig. 1.

To the front of the trunk-body A, I secure metal plates *h h*, each having a hole or opening therein, and a recess underneath the opening, as shown in section in Fig. 3. I then provide two metal parts or braces, D D, as shown in Fig. 1, their lower ends being formed to engage the plates *h h*, as shown in Fig. 2.

To apply the parts D D to the trunk, I first arrange their lower ends in the plates *h h*, then carry the said parts D D over the studs I I on the cover, and place the opposite ends of the said parts D D in the groove or channel *e* in the lock-plate L, and close the hasp C over them and lock it.

It will thus be perceived that the parts D D are rigid in the sense that they are prevented from being moved laterally or toward the ends of the trunk, and that, by being connected to one part of the trunk and engaging the other part, they prevent the lid or top from being wrenched laterally, and are thus auxiliary and supplemental to the lock and hinges, as the latter parts are relieved of the lateral strain borne by the parts D D.

It will also be seen that the parts D D are in lieu of the ordinary buckles and leather straps, and perform the function of holding the top or lid down in its closed position upon the body of the trunk, and that they are also supplemental or auxiliary to the lock and hinges in that respect.

It is also shown that the parts D D, by being extended underneath the hasp, are held to their engagement with the trunk so long as it remains locked, and, in fact, so long as the hasp is pendent or hangs vertically, or nearly so, and hence I have utilized the hasp for this purpose; but as the trunk cannot be opened until the hasp is released, I deem it best to secure them by means of the hasp, as they may then be released by the act of releasing the hasp.

Having thus described my invention, what I claim as new, and desire to secure by Letters Patent, is—

1. In combination with a trunk, and supplemental to the lock and hinges thereon, metallic braces removably connected to one part of the trunk, and extending thence across the meeting-line of the body and lid, and detachably entering metallic plates on the other part of the trunk, the said braces and lid being thereby prevented from lateral movement, for the purpose specified.

2. In combination with a trunk, and supplemental to the lock and hinges thereon, exterior metallic braces removably connected to one part of the trunk and extending thence across the meeting-line of the body and lid, and detachably engaging metallic fastening devices on the other part of the trunk, for the purpose of thereby aiding in keeping the lid in its closed position.

3. The combination of the braces D D and studs I I, arranged to operate substantially as herein set forth, in connection with each other and a fastening device, for the purposes specified.

CHARLES A. TAYLOR.

Witnesses:
F. F. WARNER,
H. S. BURKHARDT.